US006749104B2

(12) United States Patent
Rabinkin

(10) Patent No.: US 6,749,104 B2
(45) Date of Patent: Jun. 15, 2004

(54) HEAT EXCHANGER MANUFACTURING METHODS AND BRAZING FILLER METAL COMPOSITIONS USEFUL THEREIN, CHARACTERIZED BY LOW NICKEL LEACHING RATES

(76) Inventor: Anatol Rabinkin, 78 Brooklawn Dr., Morris Plains, NJ (US) 07950

( * ) Notice: Subject to any disclaimer, the term of this patent is extended or adjusted under 35 U.S.C. 154(b) by 67 days.

(21) Appl. No.: 09/947,651

(22) Filed: Sep. 6, 2001

(65) Prior Publication Data

US 2002/0112350 A1 Aug. 22, 2002

Related U.S. Application Data

(60) Provisional application No. 60/233,755, filed on Sep. 15, 2000.

(51) Int. Cl.⁷ ............................................... B23K 35/22
(52) U.S. Cl. ........................ 228/183; 228/199; 228/249; 148/528
(58) Field of Search ............................. 228/248.1–262, 228/183, 199; 148/528, 530

(56) References Cited

U.S. PATENT DOCUMENTS

| 4,587,097 A | 5/1986 | Rabinkin et al. ............ 420/473 |
| 4,611,752 A | 9/1986 | Jahnke ........................ 228/194 |
| 4,928,872 A | 5/1990 | Rabinkin ..................... 228/203 |
| 4,989,775 A | 2/1991 | Shimajiri et al. ........... 228/218 |
| 5,482,580 A | 1/1996 | Scruggs ....................... 148/528 |
| 5,553,770 A | 9/1996 | Jha .............................. 228/190 |
| 6,010,578 A | 1/2000 | Ono et al. .................... 148/26 |
| 6,367,683 B1 * | 4/2002 | Rass et al. ................... 228/121 |

FOREIGN PATENT DOCUMENTS

| EP | 0 332 524 | 9/1989 |
| JP | 61-009968 | 1/1986 |
| JP | 11-114692 | 4/1999 |

* cited by examiner

*Primary Examiner*—Kiley Stoner
*Assistant Examiner*—Len Tran
(74) *Attorney, Agent, or Firm*—Ernest D. Buff and Associates, LLC; Ernest D. Buff; Gordon E. Fish

(57) ABSTRACT

Methods for the manufacture of assemblies which included brazed components and in which nickel/chromium-based filler metals are used wherein the manufactured assemblies are characterized by low leaching rates of nickel in water and water-based fluids, are disclosed. More specifically, there are disclosed methods for the manufacture of a heat exchanger or other assembly which method includes a brazing step, as well as a post-brazing conditioning step for treating the heat exchanger or other assembly. The manufactured heat exchangers and other assemblies are particularly useful in the handling of materials intended for human consumption such as water, beverages or food as the manufactured heat exchangers or other assemblies are characterized by reduced leaching rates of nickel into fluids passed through the heat exchanger. Brazing compositions useful in such manufactured assemblies are also described.

11 Claims, No Drawings

HEAT EXCHANGER MANUFACTURING METHODS AND BRAZING FILLER METAL COMPOSITIONS USEFUL THEREIN, CHARACTERIZED BY LOW NICKEL LEACHING RATES

This application claims the benefit of Provisional application Ser. No. 60/233,755, filed Sep. 15, 2000.

FIELD OF THE INVENTION

The invention is generally a method for the manufacture of assemblies which included brazed metal components, wherein the manufactured assemblies are characterized by low leaching rates of nickel into a fluid contacting the brazed metal components.

The invention is particularly directed to methods for the manufacture of assemblies which included brazed metal components, such as heat exchangers as well wherein the manufactured assemblies are characterized by low leaching rates of nickel into fluids subsequently passing therethrough. These methods providing reduced nickel leaching rates are particularly useful for the production of various manufactured assemblies. These methods are particularly advantageous in the manufacture of heat exchangers and food processing equipment, including water treatment equipment, as well as other devices where low nickel leaching rates into a treated fluid would be desired.

BACKGROUND OF THE INVENTION

Brazing is a process for joining parts, often of dissimilar compositions, to each other. Typically, a brazing filler metal having a melting point lower than that of the parts to be joined together is interposed between the parts to form an assembly. This assembly of the parts to be brazed and the filler metal is then heated to a temperature sufficient to melt the filler metal but generally lower than the melting point of the parts. Upon cooling, ideally a strong, void-free joint is formed.

Brazing in widely used in the manufacture of various assemblies, which themselves may be finished articles which may be used or sold, or which assemblies may be components of such articles. One class of products produced by brazing processes are heat exchangers and food processing apparatuses. These may take a wide variety of configurations. For examples, heat exchangers such as "shell-and-tube" types, "plate/plate" and "plate/fin" type heat exchangers are most usually encountered. In the first configuration, a larger diameter housing typically referred to as a "shell" encompasses one or more small diameter tubes or pipes. According to this configuration, a first fluid (i.e., liquid, gas) passes through, the shell and about the exterior of the tubes while simultaneously, a second fluid (liquid, gas) passes through the interior of the tubes. While no physical contact is permitted between the first and second fluids, heat transfer occurs across the walls of the tubes. In plate/plate and plate/fin type heat exchangers, again a physical member, namely one or more plates separate a first fluid from a second fluid while heat transfer occurs across the plate. In these types of heat exchanger (as well as in other assemblies), metals are most commonly used due to their high strength and good heat transfer characteristics. Typically, the individual parts which are used to make up these type of heat exchangers are joined by brazing. Thus, it is imperative that joints exhibit high strength, and be resistant to any potential detrimental effects which might result from contact with one or both of the fluids.

One field of use wherein heat exchangers find utility are in the processing of materials which were ultimately used for human ingestion and consumption. These include foodstuffs as well as fluids such as water and beverages, juices, etc. Materials of construction used for heat exchangers to be used in such applications are of critical importance in that not only do they need to provide excellent operative characteristics with regard to heat transfer, but also at the same time these materials need to be compatible with the fluids being treated. One particular concern is to ensure that undesired leaching of any elemental or molecular components of the materials of construction used to produce the heat exchanger do not elute into the fluids. If they do, then it is imperative that any leaching of any such undesired materials be minimized. Frequently, local governmental or regulatory authorities have established maximum amounts of materials, such as metal ions, which may be permitted to leach per unit volume (liter, gallon) into fluids passing therethrough. Ideally, the materials of construction, including brazing filler metals, are optimized so to meet or preferably not to exceed such governmental regulations.

To minimize this undesired technical effect, the materials of construction for heat exchangers, particularly those used for foodstuffs, need to be very carefully selected. Stainless steels are very commonly encountered for they exhibit desirable properties including low leaching rates into fluids or gases, and generally good corrosion resistance. However, the brazing manufacturing process carried out at high temperatures may also affect stainless steels leaching adversely. Previously, elemental copper was used as a brazing filler metal as such featured low leaching of nickel into fluids, especially water However, the corrosion resistance of heat exchangers whose components were brazed using a copper based brazing filler metal is poor. Typically these heat exchangers required frequent replacement, which incurs cost not only for new heat exchanger assemblies, but also the costs associated with the labor and replacement of such failed heat exchanger assemblies. To improve corrosion resistance it was recently found that brazing filler metals with compositions based primarily on nickel and chromium ("Ni/Cr") can be used to join stainless steel parts used in such assemblies. Unfortunately, it was also found that when such Ni/Cr-based brazing filler metals are used, often an undesirable high amount of nickel was leached into water or other fluids flowing through these assemblies. As such Ni/Cr-based brazing, filler metals include a significant proportion of nickel, they are believed to be the source of the undesired nickel found to leach into fluids. Thus, such Ni/Cr-based brazing filler metals are usually avoided from use in applications wherein the amount of nickel leaching into a fluid is a concern, as is the case wherein materials are ultimately to be used for human ingestion or consumption. Additionally, governmental regulations in some countries have sometime imposed strict limitations in the amount of nickel which may be leached into said fluids. Accordingly, it is to one or more of these technical needs that the present invention is directed.

SUMMARY OF THE INVENTION

In a first aspect, the present invention provides methods for the manufacture of assemblies especially those which include parts made of stainless steels wherein these assemblies include parts joined using nickel/chromium-based brazing filler metals, wherein the manufactured assemblies ale characterized by low leaching rates of nickel.

In a second aspect, the present invention relates to a method for the manufacture of a heat exchanger or other manufactured assembly which method includes a brazing step, as well as a post-brazing conditioning step for treating the heat exchanger. The manufactured heat exchangers are characterized by reduced leaching rates of nickel into fluids passed through the heat exchanger.

In a third aspect of the invention, there are provided manufactured assemblies which comprise parts joined by nickel/chromium-based brazing filler metals, wherein the assemblies are characterized bid reduced nickel leaching rates.

Further aspects and features of the invention will become more apparent from the following description.

DETAILED DESCRIPTION AND PREFERRED EMBODIMENTS

As noted, the present invention provides methods for the manufacture of assemblies which included brazed metal components, wherein the manufactured assemblies are characterized by low leaching rates of nickel in the manufactured assembly.

As is understood in the art, in any brazing process, the brazing filler metal must have a melting point that will be sufficiently high to provide strength to meet service requirements of the metal parts brazed together. However, the melting point must not be so high as to make the brazing operation difficult. Further the filler material must be compatible both chemically and metallurgically, with the materials being brazed.

The nickel/chromium-based brazing filler metals particularly useful in the methods and assemblies according to the present invention are metal alloys which can be produced in various forms, including but not limited to powders, foils, ribbons and wires according to well known techniques. Methods commonly used to fabricate alloys in powder form include gas or water atomization as well as mechanical pulverization. Alloys of the present invention are most preferably formed into ductile foils, ribbons or wire by a rapid solidification process. Such rapid solidification processes are processes whereby a melt of molten material is solidified by quenching the melt by rapidly cooling al a rate of at least about $10^{3°}$ C./sec although higher rates are known and more commonly used. Among the variety of rapid solidification processes available today, the most preferred process employs a rapidly rotating chill wheel onto which a molten alloy is cast. Such a process is per se, known to the art.

Ideally, the nickel/chromium-based brazing filler metals used according to the present invention is in the form of a ductile foil which can be readily handled. When in the form of a ductile foil form the nickel/chromium-based brazing filler metals may also be formed into complex shapes in order to fit contours in metal parts used in the assembly of manufactured assemblies. Formation into complex shapes can occur by bending or stamping the ductile foil. Further, ideally, the brazing foil should be essentially homogeneous in its compositions, that is to say that it contains no binders, such as organic binders which would provide the potential for void formation or the deposition of contaminating residues during brazing.

Rapidly solidified products produced from homogeneous melts of the alloys are usually homogeneous in the solid state. The products may be glassy or crystalline depending upon the alloy compositions and processing parameters. In addition, products at least 50% glassy usually exhibit sufficient ductility to enable foil, ribbon and wire forms of the alloys to be bent to a radius as small as ten times their thickness without fracture. Preferably, the nickel/chromium-based brazing filler metals of the present invention are metal alloys which are formed by rapidly solidifying a melt of the metal alloy at quenching rates of at least about $10^{5°}$ C./sec. Such quenching rates produce alloys which are at least about 50% glassy and, as a result, are sufficiently ductile so as to enable them to be stamped into complex shapes. More preferably, the alloys of the present invention are at least about 80% glassy, and most preferably substantially glassy (i.e., at least 90% glassy) because substantially glassy alloys exhibit the highest degree of ductility.

The alloys useful in the present invention are particularly suited as brazing filler metals for the methods described herein. Most preferably, the alloys are produced in foil form and are useful regardless of whether the foil is glassy or microcrystalline. The foils of the present invention typically are between about 0.0007 inches and about 0.004 inches (about 18 to 100 micrometers) thick. In many instances, the foil thickness corresponds to the desired spacing between parts to be brazed.

The brazing filler metals of the present invention are particularly useful for the joining of metal parts, and in particularly stainless steel parts. Stainless steels are most frequently used in processing of fluids including foodstuffs such as juices or other beverages, such as water which are ultimately intended for human consumption. Exemplary grade of such stainless steels includes: steel S31603 according to UNS Classifications as well as the 316L stainless steel which is described as typically containing approximately 0.03% wt. carbon, 2.00% wt. manganese, 1.0% wt. silicon, 16 to 18% wt. chromium, 10 to 14% wt. nickel, 2 to 3% wt. molybdenum, 0.1% wt. nitrogen and iron as the balance to 100% wt. It is of course contemplated that other materials which may benefit from the inventive teaching can also be used in accordance with the invention described herein and enjoy the benefit of reduced nickel leaching rates. By way of non-limiting (example these include other grades of stainless steel, as well as other corrosion resistant alloys such as those including nickel or chromium.

While nickel/chromium-based brazing filler metals useful according to the invention are believed to encompass most known Ni- and Ni/Cr-based alloys which are commonly used in brazing of stainless steel parts, compositions which are particularly useful as the nickel/chromium-based brazing filler metals useful in the methods and manufactured articles according to the invention include metal alloy compositions which may be represented by the formula:

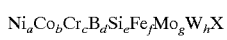

$$Ni_a Co_b Cr_c B_d Si_e Fe_f Mo_g W_h X$$

where the subscripts "a", "b", "c", "d", "e", "f", "g", and "h" are all in weight percent and wherein, "b" is between about 0 and 75, "c" is between 0 and about 25, "d" is between 0 and about 4, "e" is between 0 and about 11, "f" is between 0 and about 10, "g" is between 0 and about 5, "i" is between 0 and about 5. "X" represents other elements, including impurities which may be present to about 1 weight percent, and "a" is the balance to the total amount to 100. Preferably these nickel/chromium-based brazing filler metals consist essentially of the elements recited above. It is to be understood that the term "nickel/chromium-based brazing filler metals" encompasses alloys wherein chromium is absent, but as chromium is typically present the use of this term is retained.

Preferably, the nickel/chromium-based brazing filler metals are based on an alloy which is in a metastable structural state having at least 50 percent glassy structure, more preferably having at least 75% glassy structure, and most preferably having at least 90% glassy structure. Such alloys are also frequently referred to in the art as "amorphous metal alloys." Further examples of nickel/chromium-based brazing filler metals based on alloys which may be used as brazing filler metals described herein and which are presently commercially available include: those referred to according to ANSI classification A5.8 (per the American Welding Society) as filler metals BNi-1, BNi-1a, BNi-2, BNi-5, BNi-7, BNi-9, BNi-10, BNi-11, and BCo-1 as well as sub-categories of each. Examples of preferred Ni- and Ni/Cr-based alloys useful as the nickel/chromium-based brazing filler metals which having chemical compositions as described above and which are presently commercially available include: BNi-2, BNi-5a, and BNi-5b compositions according to the above mentioned ANSI/A5.8 Classification. Ideally, the nickel/chromium-based brazing filler metals used according to the present invention are in ductile foil form which can be readily handled and when necessary, shaped to fit contours or shaped into necessary complex shapes. Further ideally, the nickel/chromium-based brazing filler metals are brazing foils essentially homogeneous in its composition, that is to say that it contains no binders, such as organic binders which would provide the potential for void formation or the deposition of contaminating residues during brazing.

In a preferred aspect of the invention there is provided a method for the manufacture of heat exchangers and other apparatuses which are ultimately used for the processing of materials for human ingestion or human consumption which method includes a brazing step, as well as a post-brazing conditioning step for treating the heat exchanger or other apparatus. These manufactured heat exchangers and other apparatuses are characterized by reduced leaching rates of nickel into fluids passed therethrough.

According to this method there is a provided a method for the manufacture of a heat exchanger or other assembly which includes brazed parts which includes the steps of:

(a) juxtaposing parts to define one or more joints therebetween;

(b) supplying to the one or more joints a nickel/chromium brazing filler metal;

(c) heating the juxtaposed parts and the brazing filler metal under appropriate conditions in order to cause the melting of the brazing filler metal;

(d) cooling the melted brazing filler metal to produce a brazed joint;

(e) subsequently, conditioning the brazed parts by exposing it to an elevated temperature, preferably at a temperature of from about 150° C. to about 600° C., but preferably between about 150° C. to about 400° C. in an oxygen-containing atmosphere, preferably air, for a sufficient time to substantially reduce the amount of nickel leaching into water or other fluids contacting the brazed joints of the brazed assembly.

In a preferred embodiment of the method described above, as the nickel/chromium-based brazing filler metals (in which cobalt may be absent) there is provided a brazing filler metal having a composition represented by the formula:

$Ni_aCo_bCr_cB_dSi_eFe_fMo_gW_yX$ where the subscripts "a", "b", "c", "d", "e", "f", "g", and "h" are all in weight percent and wherein, "b" is between about 0 and 75, "c" is between 0 and about 25, "d" is between 0 and about 4, "e" is between 0 and about 11, "f" is between 0 and about 10, "g" is between 0 and about 5, "h" is between 0 and about 5, "X" represents other elements, including impurities which may be present to about 1 weight percent, and "a" is the balance to the total amount to 100.

Preferably in the process described above heating of the juxtaposed parts to cause the brazing of the parts occurs in a closed oven in the presence of a protective gas such as argon or nitrogen. Alternately, heating may occur in a closed oven under vacuum conditions as well and in certain instances is preferred. These brazing conditions are typically used in industry to achieve a high joint strength and integrity when using Ni/Cr-based filler metals containing oxygen-active elements such as boron, silicon, and phosphorus. During this heating stage of the brazing cycle the parts and joint surfaces which are present under vacuum conditions or are under a protective atmosphere acquire only an insufficiently thin layer of chromium oxide. Such a chromium oxide layer has however been found wholly deficient in protecting against leaching of nickel from the brazed joint into a fluid passing through an assembly. The present inventor has overcome this deficiency in the prior art by his post-brazing step wherein an assembly, such as a heat exchanger or other device is maintained in an oxygen-containing atmosphere, such as air, at an elevated temperature for a sufficient time in order to provide for the satisfactory buildup of a surface oxide layer, believed to be predominantly composed of chromium oxide on the brazed parts and joints of the assembly. With respect to this post-brazing conditioning step, the brazed assembly is exposing it to a temperature of from about 150° C. to about 600° C. under an oxygen-containing atmosphere, preferably air, for a sufficient time to sufficiently oxidize the brazed joint of the assembly. While it will be understood that the optimal treatment conditions depend upon the type and size of the assembly, being treated, the optimal treatment conditions for a particular assembly may be determined by routine experimentation, such as by varying the time and temperature of the exposure to the elevated temperature. Surprisingly, the present inventor has found that better results are typically expected when the brazed assemblies are exposed to lower temperatures, preferably between about 150° C.–400° C., in the oxygen-containing atmosphere. This was in contravention to the normal expectation that higher temperatures would provide more effective and perhaps shorten the exposure time of the brazed joints to elevated temperatures.

Manufactured assemblies, and especially heat exchangers manufactured according to the methods described herein are characterized by reduced leaching rates of nickel into water-based fluids passed therethrough. With respect to the reduction of nickel leaching, which is attained by the practice of the post-brazing conditioning step it is to be understood that the degree of reduction may vary. While it is to be understood that any reduction in nickel leaching, particularly into a liquid such as water is to be considered to fall within the scope of the present invention, a reduction on the order of at least 50%, preferably at least about 70% and most preferably a reduction of at least about 85% is attained. Such percentages are based upon a comparison of the nickel leaching rates under identical test conditions of trio identical heat exchangers (or other manufactured assembly) which have been similarly manufactured, but wherein only one is manufactured in a process which includes the post-brazing conditioning step described herein.

The present inventor has unexpectedly found that the post-brazing conditioning step has overcome many of the technical problems which to date have plagued the art. More particularly the heat exchangers and other assemblies according to the present invention surprisingly elute ("leach") a substantially reduced amount of nickel into water-based fluids passing therethrough as compared to the same heat exchangers wherein the final post-brazing conditioning step has been omitted. This is surprising due to the fact that as the brazing filler metals described herein typically include a substantial amount of nickel in their compositions and, therefore, a significant leaching of nickel would be expected. However, it has been found that the post-brazing conditioning step substantially reduces this effect. Prior to the present invention, it has been nearly impossible to attain in stainless steel heat exchangers brazed using nickel/chromium-based alloys of the type described herein which had nickel leaching rates comparable to the nickel leaching rates of like stainless steel heat exchangers which included brazed joints wherein a copper brazing filler metal was used.

Additionally, the heat exchangers and other assemblies produced according to the process described herein are believed to exhibit greatly increased resistance corrosion which in turn provides a substantially longer expected service life of the assembly. This is particularly relevant as a longer service life reduces the risk of failure, as well as reduces the expected frequency of replacement or maintenance of such heat exchangers and other assemblies.

Significant fields of application wherein the inventive heat exchangers and other assemblies manufactured according to them methods described herein include the cooling of drinking water or other beverages. Of course the methods described herein can be used in manufacture of other devices or articles useful both within the technical area related to in food and beverage processing, as well as outside of this technical area.

It will of course be understood that the utility of the present invention is not limited to the manufacture of heat exchangers but also finds use in any application wherein it is desired to reduce the amount of nickel which may leach from two or more brazed metal parts. More generally then invention also relates to process for joining two or more metal parts, particularly two or more stainless steel parts, which process comprises the steps of:

(a) placing brazing filler metal between the parts to form an assembly, the brazing filler metal having a melting temperature less than that of any of the parts;

(b) heating, the assembly to at least the melting temperature of the brazing filler metal such as (c) cooling the assembly; and subsequently, (d) subsequently, conditioning the brazed parts by exposing it to an elevated temperature, preferably at a temperature of from about 150°–600° C., but preferably between about 150°–400° C. in an oxygen-containing atmosphere, especially air, for a sufficient time to substantially reduce the amount of nickel leaching into water or other fluids contacting the brazed joints of the brazed assembly.

EXAMPLES

Three industrial plate/plate heat exchangers made of 316L stainless steel plates were obtained from industry. A first heat exchanger (#1) was used as a reference, and comprised plates of type 316L stainless steel which were brazed using a using copper brazing filler metal. Four further heat exchangers (#2–#5) used to demonstrate the invention comprised identical plates of type 316L stainless steel which however were brazed using a BNi-5b nickel-based amorphous brazing filler metal. According to the AWS Classification the BNi-5b filler metal has a composition (wt. %): Ni-balance to 100%, chromium-15%, silicon-7.25% and boron about 1.40% (with up to about 1% minor impurities). All three heat exchangers were brazed in a vacuum furnace under the following conditions: #1 at about 1110° C. for about 30 minutes; #2 through #5 at about 1180° C. for 60 minutes. Such conditions were required in order to provide appropriate conditions for brazing using the brazing filler metals.

Initial testing of nickel leaching in the "as-brazed" heat exchangers was carried out according to the following protocol:

Each of two compartments of each of the as-brazed heat exchangers were rinsed with copious amounts of tap water and afterwards the two compartments were filled with tap water. The water filled heat exchangers were allowed to stand ("stagnate") for 72 hours at room temperature. Alter this stagnation prior, samples of water were taken from each compartment. These samples were analyzed by means of inductively coupled plasma emission spectrometry to determine the nickel concentration leached in the water samples. For this analysis a standard analytical instrument, an Optima 3300 DV was used. This instrument has an accuracy of ≠0.002 ppm when measuring the amount of nickel in aqueous solutions. As is evident from the results of these tests shown in the accompanying Table, heat exchanger #1 brazed with copper exhibits a lower nickel concentration than the as-brazed heat exchangers #2–#5 brazed with Ni-based BNi-5b filler metal. This however is not surprising, as a significant proportion of the BNi-5b nickel-based amorphous brazing filler metal is nickel.

To substantially reduce nickel leaching, the #2 and #3 heat exchangers were further processed and subjected to a post-brazing treatment step as described above. Heat exchangers #2 and #3 were subjected to an additional post-brazing step wherein they were heated, in an air atmosphere, to temperatures of either 400° C. (Ex. #1) or 500° C. (Ex. #2) for 1 hour. The appearance of these heat exchangers after this post-brazing step was changed from shiny metallic to slightly brownish, as they were now coated with a protective oxide layer composed mostly of $Cr_2O_3$ which was believed as having a few hundred angstrom thickness. Because the temperature of this conditioning was much lower than the brazing temperature, and the oxide layer formed was relatively thin, no degradation of any mechanical properties occurred.

The thus treated heat exchangers #2 and #3 as well as copper brazed heat exchanger #1 were again rinsed as described above, and again exposed to water for 72 hours in the manner described above, and again in accordance with the previously described protocol, samples were taken from the stagnant water after 72 hours, and analysis for nickel concentration was made. The results are denoted in the Table. Surprisingly, the heat exchanger of Ex. #2 exhibited a very significant drop in the amount of nickel which was leached into the stagnant water. The results for the heat exchanger of Ex. #3 also exhibited a drop in leached nickel, although to a lesser extent than Ex. #2. Subsequently, heat exchanger #2 was subjected to a additional annealing treatments for additional time periods of 2 and 5 hours under an air atmosphere bringing the total annealing time of that heat exchanger (Ex. #2) to a total of 8 hours. Water testing and analyses in accordance with the protocol previously described were also made after each additional annealing treatment of this heat exchanger, thus providing leached nickel concentrations after each of the 2, 5 and 8 hours of post-brazing treatment. The results of the analyses are compiled and reported in the Table.

Heat exchangers #4 and #5 were also subjected to an additional post-brazing step wherein as described with reference to #2 and #3 described above in that they were heated, in an air atmosphere, to first heat treatment temperatures of either 450° C. (Ex. #4) or 350° C. (Ex. #5) for respectively, 4 hours or 10 hours. Again, the appearance of these heat exchangers after this post-brazing step was changed from shiny metallic to slightly brownish, as they were now coated with a protective oxide layer composed mostly of $Cr_2O3$ which was believed as having a few hundred angstrom thickness. Because the temperature of this conditioning, seas much lower than the brazing temperature, and the oxide layer formed was relatively thin, no degradation of any mechanical properties occurred.

The thus treated heat exchangers #4 and #5 were rinsed as described above, and again exposed to water for 72 hours in the manner described above. Again, in accordance with the previously described protocol, samples were taken from the stagnant water after 72 hours, and analysis for nickel concentration was made. The results are denoted in the Table. Again, both heat exchangers were subjected to additional annealing treatments for additional time periods of 10 hours at 450° C. under an air atmosphere bringing the total post-brazing annealing time of heat exchanger #4 to 14 hours, while heat exchanger #5 was subjected to a total post-brazing annealing time of 20 hours. Water testing and analyses in accordance with the protocol previously described were also made after each additional annealing treatment of this heat exchanger, thus providing leached nickel concentrations at various time intervals of the post-brazing treatment. The results of the analyses are compiled and reported in the Table, following While described in terms of the presently preferred embodiments, it is to be understood that the present disclosure is to be interpreted as by way of illustration, and not by way of limitation and that various modifications and alterations apparent to one skilled in the art may be made without departing from the scope and spirit of the present invention.

What is claimed is:

1. A method for the manufacture of an assembly comprising brazed metal parts, which includes the steps of:
   (a) juxtaposing parts to define one or more joints therebetween;
   (b) supplying to the one or more joints a nickel/chromium brazing filler metal;
   (c) heating the juxtaposed parts and the brazing filler metal under appropriate conditions in order to cause the melting of the brazing filler metal;
   (d) cooling the melted brazing filler metal to produce a brazed joint; and
   (e) subsequently, conditioning the brazed parts by exposing it to an elevated temperature, in an oxygen-containing atmosphere, for a sufficient time to substantially reduce the amount of nickel leaching into water or other fluids contacting the brazed joints of the brazed assembly.

2. The method according to claim 1 wherein the oxygen-containing atmosphere is air.

3. The method according to claim 1 wherein the conditioning of the brazed parts is carried out at the elevated temperature of from about 150° C. to about 600° C.

4. The method according to claim 3 wherein the conditioning of the brazed parts is carried out at the elevated temperature of from about 150° C. to about 400° C.

TABLE

| # | Base Metal/Filler Metal Materials | Brazing Conditions | Post-Brazing Treatment in Air, hours (h) | Exposure Time to Water Stagnated, hours (h) | Ni Concentration in Water, mg/l Small Port/ Vol. 390 ml | Ni Concentration in Water, mg/l Large Port/ Vol. 315 ml | Average Ni Concentration in Water, mg/l |
|---|---|---|---|---|---|---|---|
| 1 | 316L/Cu/316L | 1110° C. for about 30 min | None | 72 h (after rinsing) | N/A | 0.87 | 0.87 |
|   |   |   | None | +72 h (after +5 months in ambient atmosphere and rinsing) | 0.487 | 0.521 | 0.504 |
| 2 | 316L/BNi-5b/316L | 1180° C. for about 60 min | None | 72 h (after 10 min rinsing) | 6.42 | 8.38 | 7.42 |
|   |   |   | 1 h at 400° C. | +72 h (after 10 min rinsing) | 0.593 | 0.777 | 0.685 |
|   |   |   | +2 h at 400° C. | +72 h (after 10 min rinsing) | 0.510 | 0.647 | 0.578 |
|   |   |   | +5 h at 400° C. | +30–32 h (after 10 min rinsing) | 0.971 | 1.05 | 1.01 |
|   |   |   |   | +72 h (after 10 min rinsing) | 0.603 | 0.548 | 0.575 |
| 3 | 316L/BNi-5b/316L | 1180° C. for about 60 min | None | 72 h (after 10 min rinsing) | 5.85 | N/A | 5.85 |
|   |   |   | 1 h at 500° C. | +72 h (after 10 min rinsing) | 0.857 | 2.87 | 1.86 |
| 4 | 316L/BNi-5b/316L | 1180° C. for about 60 min | None | — | N/A | N/A | N/A |
|   |   |   | 4 h at 450° C. | 72 h (after 10 min rinsing) | 1.94 | 1.78 | 1.86 |
|   |   |   |   | +72 h (after 10 min rinsing) | 2.82 | 2.93 | 2.87 |
|   |   |   | +10 h at 400° C. | 72 h (after 10 min rinsing) | 0.71 | 0.87 | 0.79 |
|   |   |   |   | +72 h (after 10 min rinsing) | 0.40 | 0.50 | 0.45 |
| 5 | 316L/BNi-5b/316L | 1180° C. for about 60 min | 10 h at 350 | 72 h (after 10 min rin.) | 0.665 | 1.15 | 0.90 |
|   |   |   |   | +72 h after 10 min rinsing) | 3.04 | 2.21 | 2.62 |
|   |   |   | +10 h at 400 | 72 h (after 10 min rinsing.) | 1.47 | 1.65 | 1.56 |
|   |   |   |   | +72 h (Σ144) (after 10 min rinsing) | 0.429 | 0.484 | 0.456 |

As the data in the Table shows, the post-brazing conditioning according to the present invention very substantially improves the resistance to nickel leaching of industrial heat exchangers brazed with BNi-5b nickel containing brazing filler metal with results comparable to that of the copper brazed heat exchanger conditioning at 400° C. was found to result in a better resistance to nickel leaching than conditioning carried out at 500° C.

5. The method according to claim 1 wherein as the nickel- and/or nickel/cobalt-based brazing filler metal there is provided a brazing filler metal having a composition represented by the formula:

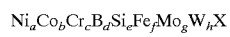

$Ni_aCo_bCr_cB_dSi_eFe_fMo_gW_hX$ where the subscripts "a", "b", "c", "d", "e", "f", "g", and "h" are all in weight percent and wherein; "b" is between about 0 and 75, "c" is between 0 and about 25, "d" is between 0 and about 4, "e" is between 0 and about 11, "f" is between 0 and about 10, "g" is between 0 and about 5, "h" is between 0 and about 5, "X" represents other elements, including impurities which may be present to about 1 weight percent, and "a" is the balance to the total amount to 100 weight percent.

6. A process for joining two or more metal parts, which comprises the steps of:
 (a) placing a nickel/chromium brazing filler metal between the parts to form an assembly, the brazing filler metal having a melting temperature less than that of any of the parts;
 (b) heating the assembly to at least the melting temperature of the brazing filler metal;
 (c) cooling the assembly; and subsequently,
 (d) conditioning the brazed parts and joints by exposing it to an elevated temperature in an oxygen-containing atmosphere for a sufficient time to substantially reduce the amount of nickel leaching into water or other fluids contacting the brazed joints of the brazed assembly.

7. The process according to claim 6, wherein the oxygen-containing atmosphere is air.

8. The process according to claim 6, wherein the brazed parts are exposed to a temperature of from about 150° C. to about 600° C.

9. The process according to claim 8, wherein the brazed parts are exposed to a temperature of from about 150° C. to about 400° C.

10. The process according to claim 6, the nickel/chromium brazing filler metal having a composition represented by the formula:

$$Ni_aCo_bCr_cB_dSi_eFe_fMo_gW_hX$$

where the subscripts "a", "b", "c", "d", "e", "f", "g", and "h" are all in weight percent and wherein; "b" is between about 0 and 75, "c" is between 0 and about 25, "d" is between 0 and about 4, "e" is between 0 and about 11, "f" is between 0 and about 10, "g" is between 0 and about 5, "h" is between 0 and about 5, "X" represents other elements, including impurities which may be present to about 1 weight percent, and "a" is the balance to the total amount to 100 weight percent.

11. The method according to claim 1, wherein the assembly comprises a heat exchanger.

* * * * *